March 6, 1956

R. E. J. NORDQUIST 2,737,090

MACHINE FOR FORMING CLOSURES
ON ENDS OF FIBER CONTAINERS

Filed Dec. 26, 1951

INVENTOR.
RONALD E. J. NORDQUIST
BY Charles H. Ewe
Leland R. McCann
George W. Reiber
ATTORNEYS

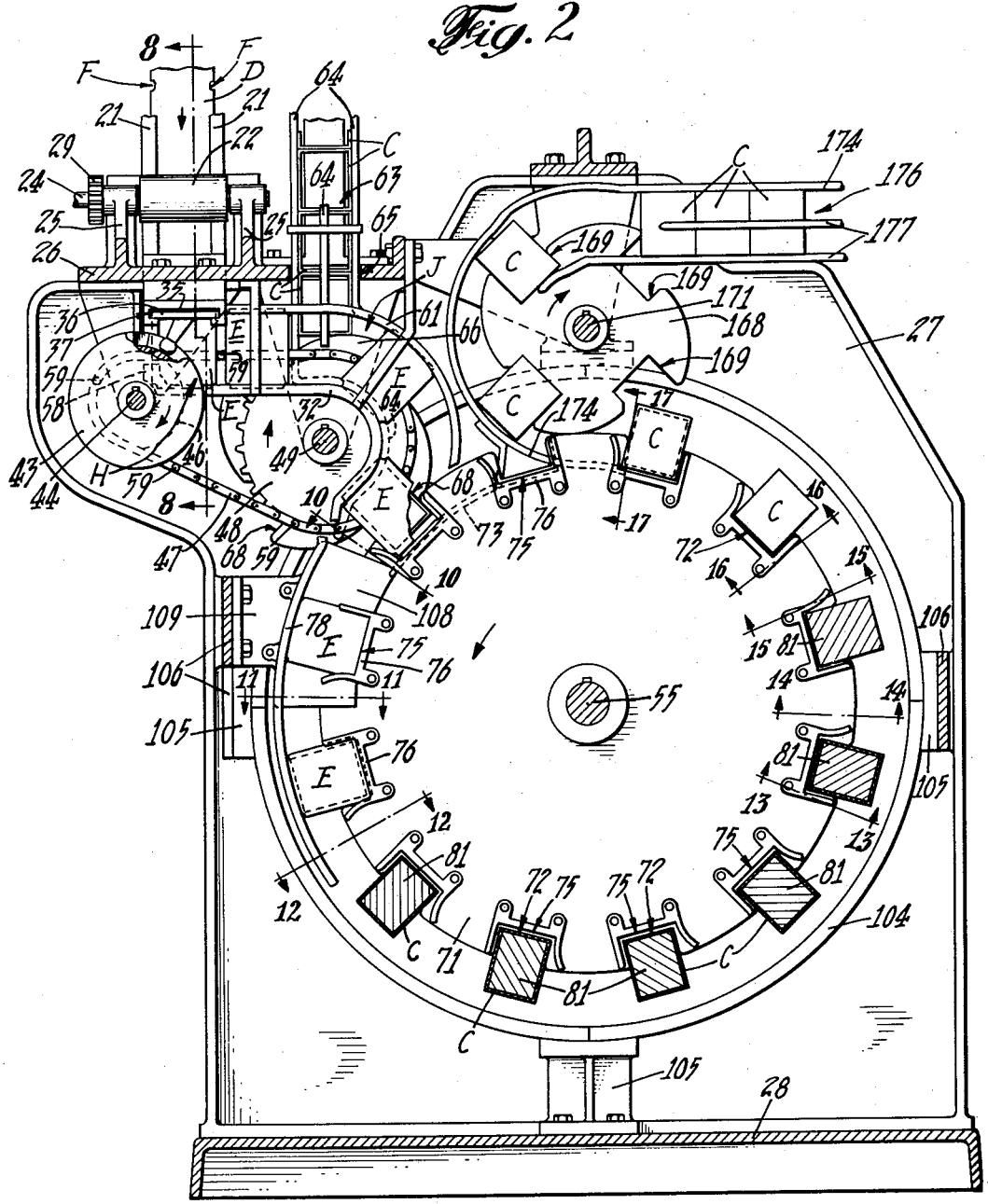

March 6, 1956
R. E. J. NORDQUIST
2,737,090
MACHINE FOR FORMING CLOSURES
ON ENDS OF FIBER CONTAINERS
Filed Dec. 26, 1951
4 Sheets-Sheet 3
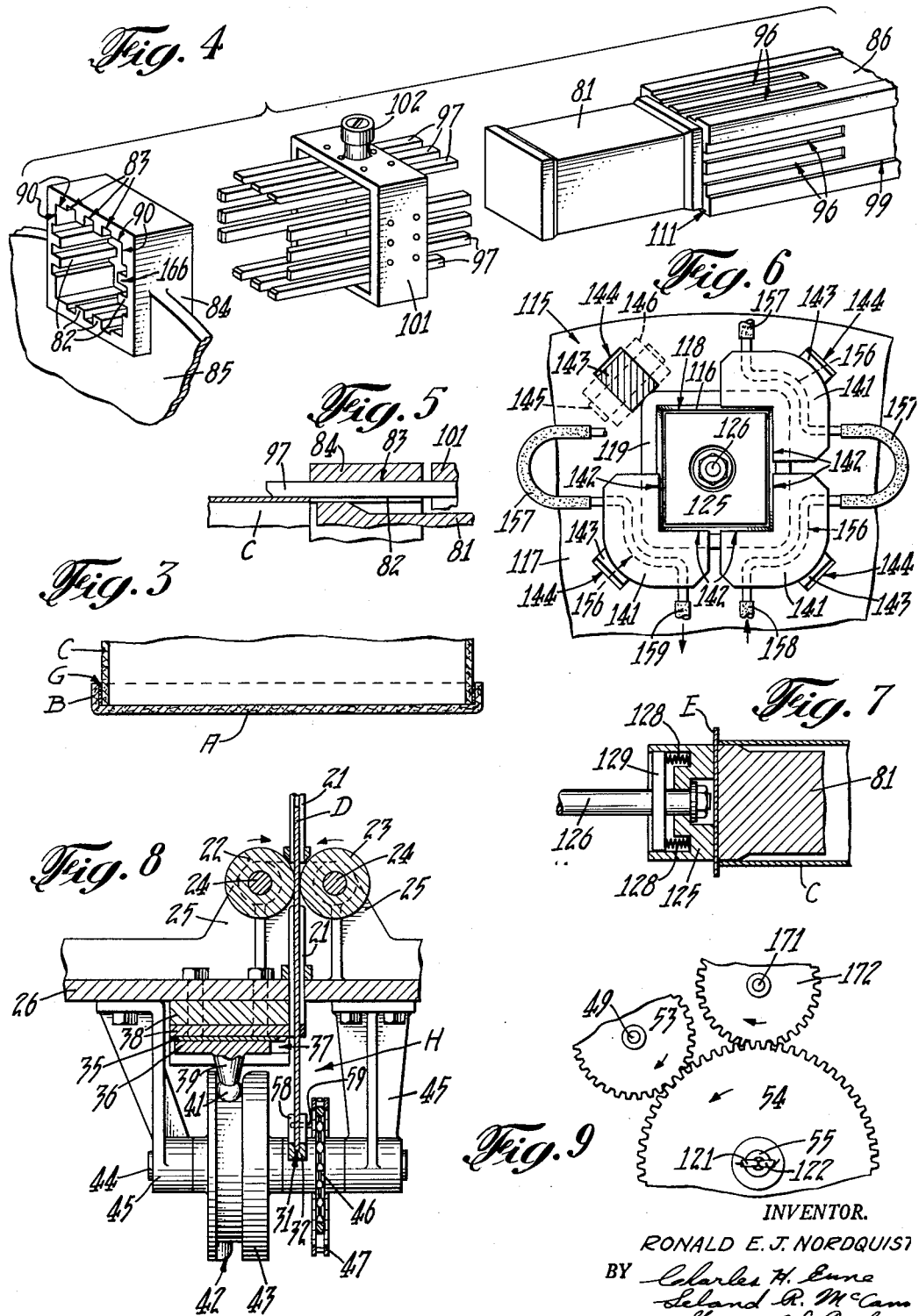
INVENTOR.
RONALD E. J. NORDQUIST
BY Charles H. Lane
Leland R. McCann
George W. Reiber
ATTORNEYS

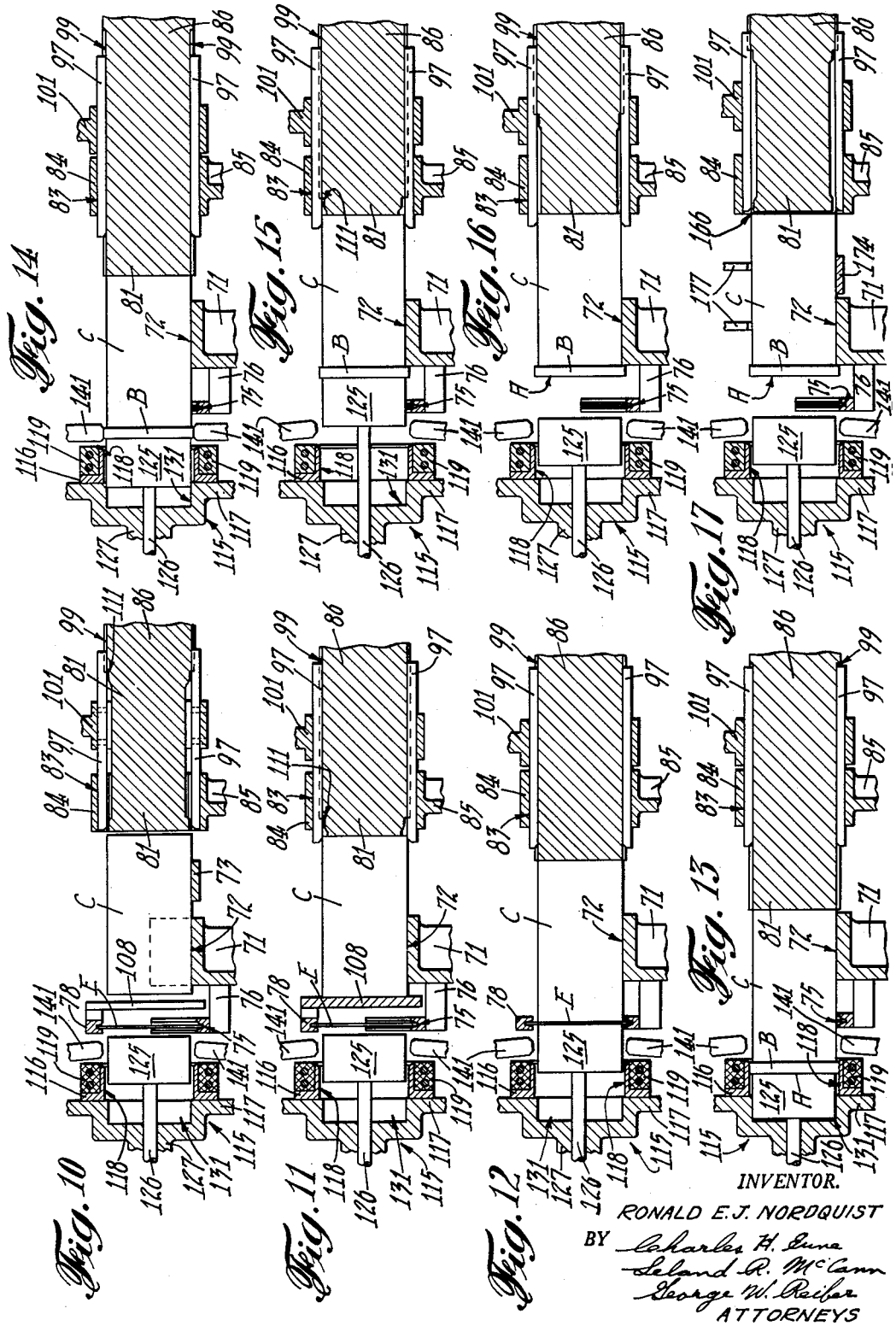

United States Patent Office 2,737,090
Patented Mar. 6, 1956

2,737,090

MACHINE FOR FORMING CLOSURES ON ENDS OF FIBER CONTAINERS

Ronald E. J. Nordquist, Maplewood, N. J., assignor to American Can Company, New York, N. Y., a corporation of New Jersey Application December 26, 1951, Serial No. 263,222

12 Claims. (Cl. 93—55.1)

The present invention relates to a machine for capping fibre containers and the like and has particular reference to devices for forming pliable sheet material into a closure on an end of a tubular fibre container body and permanently securing the closure in place under heat and cooling pressure.

An object of the instant invention is the provision of a container capping machine wherein a closure is formed from a pliable material such as soft metal, foil, fibre or a combination of these materials, around an end of a container body and permanently secured in place as a continuous operation while the body is advancing through the machine so as to insure a tight fit between the closure and the body and to effect the application of the closure to the body in an efficient and expeditious manner.

Another object is the provision of such a machine wherein the body is properly squared-up and its side walls fully supported prior to and during the capping operation to insure proper application of the closure to the body.

Another object is the provision of such a machine wherein the formation of the closure member and its initial application to the body is effected by heating and pressure devices and the final bonding of the formed closure member to the body is effected by cooling and pressure devices, both sets of devices operating to effect a continuing capping operation.

Numerous other objects and advantages of the invention will be apparent as it is better understood from the following description, which, taken in connection with the accompanying drawings, discloses a preferred embodiment thereof.

Referring to the drawings:

Fig. 2 is a reduced scale longitudinal section of the machine, as taken substantially along the broken line 2—2 in Fig. 1, parts being broken away;

Fig. 3 is an enlarged sectional view of one end of a container body with a cap or cover attached by the machine shown in Figs. 1 and 2;

Fig. 4 is an enlarged exploded perspective view of certain parts of the machine as shown at the right in Fig. 1, for supporting and aligning a container body to be capped, parts being broken away;

Fig. 5 is an enlarged fragmentary detail view of certain of the parts shown in Fig. 4 and a portion of a can body in position adjacent these parts as an incident to aligning the body;

Fig. 6 is an enlarged end elevation of one of the capping heads used in the machine, parts being broken away and parts shown in section;

Fig. 7 is a sectional view of a plunger element used in the capping heads and a portion of a body supporting mandrel with a blank for a cap clamped between them, parts being broken away;

Fig. 8 is an enlarged sectional view taken substantially along the broken line 8—8 in Fig. 2, with parts broken away;

Figure 1:
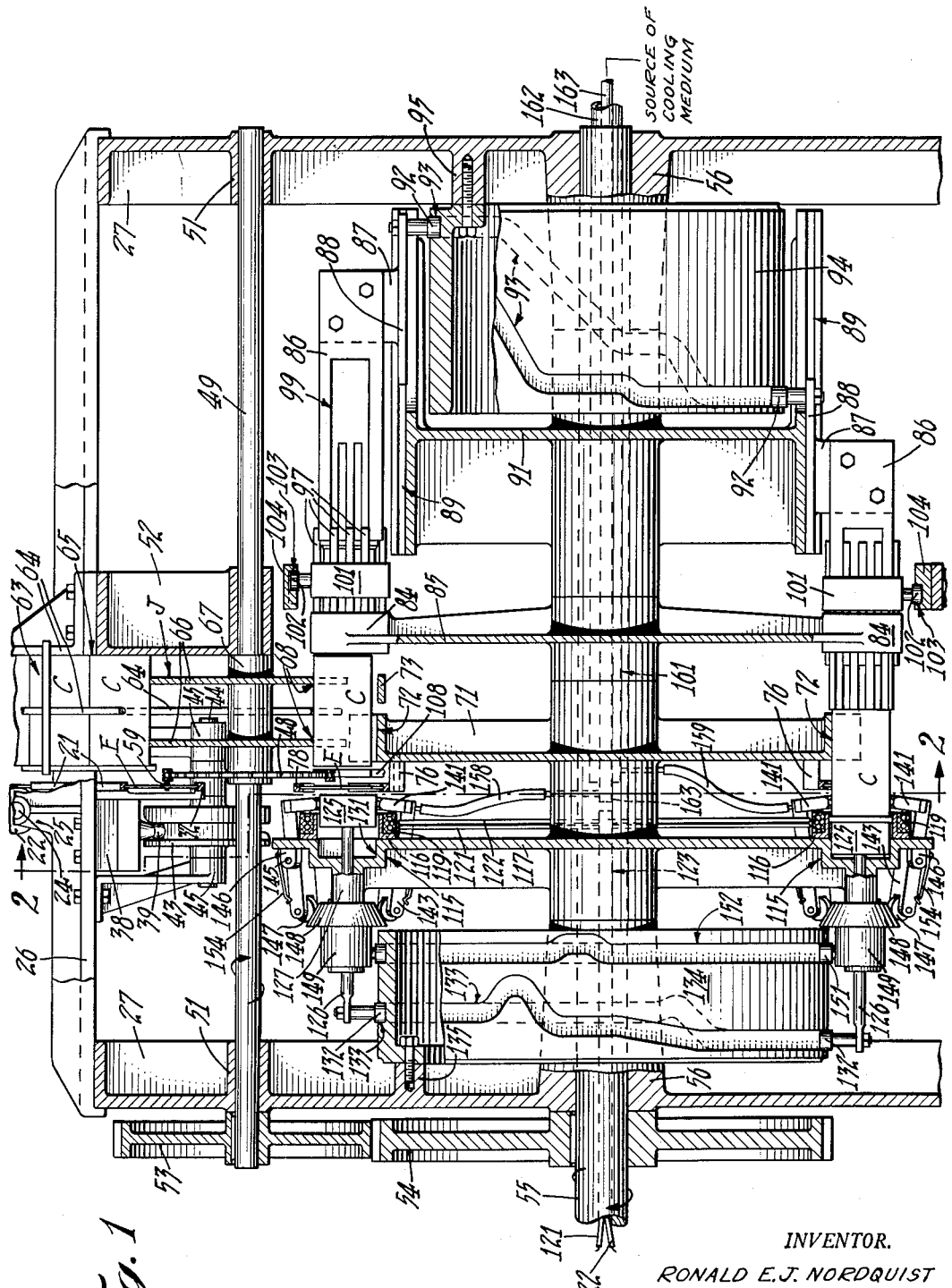
Figure 1 is a transverse sectional view of a capping machine embodying the instant invention, with parts broken away.

Fig. 9 is a reduced scale elevation of a gear train shown at the left in Fig. 1, with parts of the gears broken away; and Figs. 10 to 17 inclusive are schematic sectional views of a capping head and its immediately associated parts showing them in their relative positions at different stations in the machine as substantially indicated by the lines 10—10 to 17—17 inclusive in Fig. 2 as an incident to effecting the various steps of forming and assembling a cap with a container body.

As a preferred or exemplary embodiment of the instant invention the drawings illustrate a capping machine for forming fibre rectangular shaped slip covers A (Fig. 3) having flanges or skirts B and for securing them to one end of the fibre rectangular shaped container bodies C. The caps or slip covers A preferably are made from a substantially continuous strip or web D of fibre material (Fig. 2) from which substantially square or rectangular flat blanks E are cut to produce the covers. The width of the strip D is equal to the width of the blanks E, while the length of the blanks is set off in the strip by marginal edge notches F. These blanks are greater in area than the ends of the bodies to which they are to be attached to provide marginal edge portions for the skirts B. A band of thermoplastic adhesive G (Fig. 3) is carried on the strip along each of its marginal edge portions and transversely of the strip at the notches F.

The container bodies C and the strip D are fed into the machine simultaneously at different but adjacently located stations (Fig. 2). As the strip D is fed into the machine, a blank E is severed from it by cutting it across at a pair of the oppositely disposed notches F. This cutting of the strip at the notches leaves the blank with a band of adhesive along all four marginal edge portions on container contacting surface of the blank and further provides notches at each corner of the blank.

The severed cover blank E is immediately advanced into position adjacent one end of a received body C. The body and the cover blank thereafter travel together. During this travel the body and the blank are first maintained in spaced endwise relation while the body is properly aligned and supported from within. The cover blank is then clamped against the adjacent end of the supported body. In this position the marginal edge portions of the blank overhang or extend beyond the side walls of the body. While thus clamped together the blank and the end of the supported body are forced endwise into a heated forming die. This action bends the marginal edge portions of the blank inwardly against the side walls of the body with the adhesive interposed between the blank and the body. The heat of the die facilities this bending action to produce the skirt B and also tackifies the adhesive on the skirt to bond it to the body.

After this cover forming operation the end of the body, with the formed cover A clinging to it, is withdrawn from the forming die and is immediately engaged by chilled jaws 141. These jaws tightly press the skirt B of the cover against the walls of the body and simultaneously cool the tackified adhesive to a hardened condition which quickly and permanently bonds the cover A to the body C. The body C is thereafter stripped endwise from its support and is discharged from the machine. This completes the cycle of operation of capping a container body.

In the machine, the strip D to be cut into cover blanks E is disposed in a vertical position and is guided along its edges by vertically disposed spaced and parallel grooved guide rails 21 (Figs. 2 and 8). The strip is fed downwardly along the guide rails and into the machine by a pair of opposed horizontal feed rollers 22, 23 between which the strip passes. The rollers are mounted on drive shafts 24 journaled in bearing brackets 25 which extend up from a horizontally disposed top plate 26 carried on top of and spanning a pair of vertical side frames 27 (see also Fig. 1) which constitute the main frame of the machine. The side frames 27 are carried on a base plate 28 (Fig. 2). Rotation of the feed rollers 22, 23 preferably is effected intermittently in any suitable manner in time with the other moving parts of the machine through a gear 29 carried on one of the drive shafts 24.

During rotation of the feed rollers 22, 23 the strip D is fed downwardly through an opening in the top plate 26 until the lower end of the strip enters into a groove 31 in the upper face of a horizontally disposed track rail 32. This track rail stops further feeding of the strip and locates the lowermost potential blank in the strip at a cutting station H (Figs. 2 and 8). At this station the set of notches F in the strip above the lowermost potential blank is in alignment with a horizontally disposed cutter blade 35 which is movable toward and away from the strip.

The cutter blade 35 is carried on a slide 36 which operates in a slideway 37 formed in a bracket 38 depending from and bolted to the top plate 26. The slide is reciprocated through a cutting stroke and a return stroke by a cam arm 39 which depends from the slide. The lower end of the arm is formed with a ball 41 which operates in a cam groove 42 of a barrel cam 43 mounted on a short cam shaft 44 journaled in a pair of spaced bearing brackets 45 depending from the top plate 26.

The cam shaft 44 and the cam 43 are rotated continuously in time with the other moving parts of the machine by a sprocket 46 which is mounted on the shaft. The sprocket is rotated by an endless chain conveyor 47 which is driven by a sprocket 48 mounted on a long sprocket shaft 49 (see Figs. 1 and 2) which extends across the machine and has its ends journaled in bearings 51 formed in the side frames 27. Intermediate its ends, the sprocket shaft 49 is journaled in a bearing bracket 52 which depends from the top plate 26. One end of the sprocket shaft 49 extends beyond the side frames 27 and carries a gear 53 (see also Fig. 9) which meshes with and is driven by a driving gear 54 carried on a main shaft 55. The main shaft 55 extends across the machine and is journaled in bearings 56 formed in the side frames 27. This shaft is driven in any suitable manner.

Hence as the cam shaft 44 and the cam 43 are rotated, through the above described connection with the main shaft 55, the cam 43 shifts the slide 36 through a cutting stroke thus driving the cutter blades 35 through the strip D at the notches F and thus severing the lower end of the strip to produce the blank E. The severed blank E is supported in its upright on-edge position by the groove 31 in the track rail 32 and by a similar groove in a short upright extension 58 (Figs. 2 and 8) of the track rail.

While the cam 43 shifts the cutter slide 36 through its return stroke for a subsequent cutting operation, the severed blank E is advanced from the cutting station H and through a body receiving station J. This advancement of the blank E is effected by horizontally disposed feeding pins 59 (Figs. 1, 2 and 8) which project laterally from the conveyor 47 at spaced intervals therealong. As a blank is cut, a feeding pin 59 immediately engages behind the blank and pushes it edgewise toward the right as viewed in Fig. 2, along the grooved track rail 32. A cooperating grooved track rail 61 disposed above the rail 32 in spaced and parallel relation thereto guides the upper edge of the blank as the latter advances. These track rails 32, 61 extend through the body receiving station J.

At the body receiving station J, the tubular container bodies C, arranged in horizontal position, i. e. lying on their sides, and in vertically stacked relation, enter the machine through a vertical runway 63 (Figs. 1 and 2) defined by guide rails 64 secured to the top plate 26. The stack of bodies extends through an opening 65 in the top plate 26. The lowermost body in the stack is disposed in endwise relation to the path of travel of the blanks E along the track rails 32, 61. This lowermost body rests on the outer peripheries of a pair of vertically disposed spaced and parallel star wheels 66 located directly under the inlet runway 63 and formed on a common hub 67 mounted on and rotating with the sprocket shaft 49. The star wheels 66 are formed with spaced peripheral pockets 68 for picking off the lowermost body in the stack in time with the advancement of the cover blanks E along the track rails 32, 61.

Hence as an advancing cover blank E passes through the body receiving station J it moves into position adjacent to and in endwise but still separated alignment with the end of a container body C in a pocket 68 of the star wheels 66 and thereafter the blank and the body advance together in this alignment. The aligned blank E and body C advance along a curved path of travel around the axis of the sprocket shaft 49; the body C being retained in its pockets 68 by a curved extension of one of the body guide rails 64 and the blank E being guided by curved extensions of the track rails 32, 61 (see Fig. 2). These guide rails and track rail extensions terminate adjacent the outer periphery of a rotatable turret 71 (see also Fig. 1) mounted on and rotating with the main drive shaft 55 in time with the star wheels 66 and conveyor 47. The turret 71 is provided with peripheral spaced pockets 72, preferably square cut to receive the bodies C from the star wheels 66. A short curved guide bar 73 disposed adjacent the turret 71 is provided to temporarily support one end of a body upon reception in a turret pocket 72 (see Fig. 1).

The turret 71 is also provided with square cut cover blank receiving pockets 75 which are disposed in endwise spaced alignment with the body pockets 72 and which are formed in brackets 76 projecting outwardly from and secured to the side of the turret 71. The inner faces of the pockets 75 are grooved to receive the edges of a cover blank E.

There are a plurality of these aligned body pockets 72 and cover blank pockets 75 in the turret 71 and they are peripherally spaced to register with the star wheel pockets 68 and the feeding pins 59 of the conveyor 47 as the turret, the star wheels and the conveyor operate in unison. Hence as a body C in the star wheels 66 and its endwise aligned and spaced cover blank E on the conveyor 47 move into register with a body pocket 72 and a blank pocket 75 in the turret, the body and blank are transferred to the latter pockets and continue their travel with the turret along a curved path of travel around the main drive shaft 55.

At the beginning of this travel with the turret 71, the cover blank E and the body C are confined in their pockets. For this purpose the outer unsupported edge of the cover blank E rides into a groove of a retaining rail 78 which curves around the turret 71 for a short distance and thus retains the blank in its pocket 75.

Confinement of the body C to its pocket is effected by supporting the body from within. This support is also utilized to shift the body laterally in its pocket for the capping operation. For these purposes a reciprocable mandrel 81 (Fig. 4) is disposed adjacent and in alignment with each body pocket 72 in the turret 71 (at the right as viewed in Figs. 1 and 10 to 17 inclusive). These mandrels 81 preferably are square to fit the inside of the bodies C and in length are substantially equal to the length of the bodies. They operate against inner bearing faces, tongues, or ribs 82 (Figs. 4 and 5) which are set off by grooves 83 in square support bearings or blocks 84 formed on a bearing disc 85 disposed adjacent the turret 71 and mounted on the main shaft 55 for rotation with the shaft and the turret. There is one bearing block 84 for each mandrel.

The mandrels 81 are formed on long square actuating blocks 86 the outer ends of which are secured to uprights 87 (Fig. 1) of slides 88 operating in dovetail slideways 89 formed in the outer face of a rotatable drum 91. The drum is mounted on the main drive shaft 55 for rotation with the shaft and the turret 71. The slides 88 carry cam rollers 92 which operate in a cam groove 93 formed in a stationary barrel cam 94 which surrounds the main drive shaft 55 and which is bolted to bosses 95 formed on the adjacent side frame 27 (at the right as viewed in Fig. 1).

Hence as the drum 91 rotates with the turret 71, the cam rollers 92 traverse the stationary cam groove 93 in the cam 94 and thereby reciprocate the slides 88 and the mandrels 81 attached thereto, toward and away from the turret 71 to support and shift the container bodies C for a capping operation and to release the bodies upon the completion of this operation as will be hereinafter explained. During this reciprocation of the mandrels, the actuating blocks 86 enter the support bearings 84 and slide on corner faces 90 (Fig. 4). Clearance grooves 96 are also provided in the actuating blocks 86 for clearing the ribs 82 in the support bearing 84.

Before a mandrel 81 engages a body C the body is properly aligned into a square or squared-up position and axially aligned with the mandrel to facilitate entrance of the mandrel into the body. This squaring and aligning operation is effected by squaring units which surround each mandrel 81 so that they travel with the turret 71. Each unit comprises a plurality of spaced and parallel short squaring bars or fingers 97 (Figs. 1, 4 and 5) which are arranged in a hollow square around the mandrel for telescoping over an end of the body C. The forward or body engaging ends of the bars are preferably tapered to facilitate their riding over the outer end edges of the body. The bars 97 are reciprocable in unison in the grooves 83 formed in the mandrel support bearings 84 and in recesses or wide grooves 99 formed in the mandrel actuating blocks 86. For this purpose the bars 97 are secured in a square hollow support member 101 which surrounds the mandrel 81. Reciprocation of the bars 97 is effected by a cam roller 102 mounted on each of the members 101. These rollers operate in a cam groove 103 (Fig. 1) of a stationary ring cam 104 secured by brackets 105 (Fig. 2) to the machine base plate 28 and to cross plates 106 extending between and secured to the side frames 27.

Hence as the disc 85 and the drum 91 rotate with the turret 71, the squaring finger support members 101 surrounding the mandrels 81 are carried around a circular path of travel around the main drive shaft 55 and the cam rollers 102 traverse the stationary cam groove 103 to effect the timed reciprocation of the squaring bars 97. During this rotation of these various parts and as soon as a body C and its cover blank E are received in their respective pockets 72, 75 in the turret 71, the groove 103 in the stationary ring cam 104 urges the adjacent support member 101 from the position shown in Figs. 1 and 10 toward the turret 71, i. e. toward the left as viewed in these figures and this action telescopes the squaring bars 97 over the adjacent end of the body C in its turret pocket 72 as shown in Fig. 11. This action takes place during the rotation of the turret from the station indicated by the section line 11—11 in Fig. 2. The tapered inner faces of the forward ends of the squaring bars 97 engage around and ride over the end of the body as the bars move toward the body and thus square-up the sides of the body if they are inclined to be out of square and align the body axially with the adjacent mandrel 81. This action also pushes the body longitudinally of its axis, toward the left as viewed in Figs. 1, 10 and 11, against a backing-up plate 108 (see also Fig. 2) which is disposed between the body pocket 72 and the cover blank pocket 75 in the turret 71 and which extends for a short distance along the path of travel of these pockets. The backing-up plate 108 is part of a bracket 109 secured to the adjacent cross plate 106.

While the squaring bars 97 surround the end of the body C and thus hold it in a squared position in axial alignment with the mandrel 81, the groove 93 in the stationary barrel cam 94 urges the slide 88 and its mandrel actuating block 86 and mandrel 81 toward the turret pocket 72 (left as viewed in Figs. 1, 10 and 11) and thus pushes the mandrel into the body as shown in Fig. 11. This movement of the mandrel continues until it is fully inserted into the body, the body being held against longitudinal travel by the backing-up plate 108.

When the mandrel is fully within the body for the full length of the body so that the forward end of the body is backed-up or supported by the mandrel, the back or outer end of the body engages a stop shoulder 111 (Figs. 4, 10 and 11) formed on the mandrel actuating block 86 and engagement with this shoulder forces the body against the back-up plate 108 if it is not already in this position. With the ends of the body C engaging against the back-up plate 108 and the stop shoulder 111 of the mandrel and thus fully supported on the mandrel, the inward travel of the mandrel is temporarily arrested until the turret 71 rotates far enough to permit the body to ride off of the back-up plate 108.

In this fully supported position of the body C, it is in axial alignment with the cover blank E, and beyond that in axial alignment with a capping head 115 (Figs. 1, 6 and 10 to 17 inclusive). There is one of these capping heads 115 for each pocket 72 of the turret 71. Each capping head includes a hollow die 116 (Figs. 6 and 10) disposed in axial alignment with its associated body pocket 72 of the turret 71 and secured to the inner face of a head disc 117 mounted on the main drive shaft 55 for rotation with the shaft and the turret 71. The die 116 is provided with a square cap forming recess 118 of slightly larger dimensions than the end of the body C to form a close fitting cover for the body. The leading inner edge of the die surrounding its recess 118 is beveled as best shown in Figs. 6 and 10.

The forming die 116 preferably is heated to facilitate forming of the cover and heating the cover adhesive and for this purpose is surrounded by a conventional electric heating unit 119. Electric current conducting wires 121, 122 (Fig. 1) extend from the heating units of all the heads and pass through openings in the hub of the head disc 117 and a longitudinal channel 123 in the main drive shaft 55 to any suitable source of electric current.

Each forming die 116 within its forming recess 118 is provided with a square yieldable clamping pad or knockout 125 (see also Fig. 7). This pad 125 is loosely retained, by a washer and nut, on the inner end of a horizontally disposed knockout rod 126 carried in a long bearing 127 on the head disc 117. The pad is backed-up by compression springs 128 which are interposed between the pad and a shoulder plate 129 secured to the knockout rod. The pad 125 is in axial alignment with a deep recess 131 (Figs. 1 and 10) in the head disc 117 to permit sufficient travel of the pad during a cover forming operation.

The knockout pad 125 is reciprocated within the die recess 118 and disc recess 131 by cam action. For this purpose the outer end of the knockout rod 126 carries a cam roller 132 (Fig. 1) which operates in a cam groove 133 in a stationary barrel cam 134 surrounding the main drive shaft 55 and bolted to bosses 135 projecting inwardly from the adjacent side frame 27.

Adjacent the beveled edges of the forming dies 116, each capping head 115 is provided with a set of four chilled pressure or squeezer jaws 141 (Figs. 1, 6 and 10 to 17 inclusive) which are disposed at the corners of the dies. The jaws are L-shaped and have straight pressure faces 142 (Fig. 6) which extend along the sides of the dies in parallelism therewith for substantially one half their length. These jaws 141 normally are open as shown in Figs. 1, 6 and 10 and are mounted on the inner ends of rocker arms 143 for movement toward and away from the axis of the forming dies. The arms 143 extend outwardly through openings 144 in the head disc 117 and beyond the disc are mounted on pivot pins 145 (Fig. 1) carried in lugs 146 which project from the disc.

The outer ends of the rocker arms 143 carry actuating rollers 147 (Fig. 1) which engage against an actuating cone 148 slidably mounted on the knockout rod 126. The cone 148 however is non-rotatable on the knockout rod. The cone is formed with a long hub 149 which carries a cam roller 151 which operates in a cam groove 152 provided adjacent the cam groove 133 in the barrel cam 134. Flat leaf springs 154 secured to the lugs 146 exert a pressure against the outer ends of the rocker arms 143 and thus maintain the actuating rollers 147 in engagement with the actuating cones 148.

The pressure jaws 141 preferably are maintained in a chilled or cooled condition by circulating through them a fluid cooling medium. For this purpose the jaws 141 are provided with circulating passageways or channels 156 (Fig. 6) the ends of which in adjacent jaws are connected together by flexible tubes 157. In this manner the cooling medium is circulated through all of the jaws.

The adjacent ends of the channels 156 in two of the jaws are connected to inlet and outlet tubes 158, 159. The outlet tubes 159 from all of the capping heads 115 pass through openings in the hub of the head disc 117 and communicate with an axially disposed bore 161 formed in the main drive shaft 55. The bore extends outwardly to the end of the shaft (at the right in Fig. 1) and communicates with a continuing outlet pipe 162 threaded into the end of the shaft. In a similar manner the inlet tubes 158 from all of the capping heads 115 pass through openings in the hub of the head disc 117 and communicate with an inlet pipe 163 (Fig. 1) which extends through the bore 161 in concentricity therewith. The outer ends of the pipes 162, 163 lead to and from any suitable source of the cooling medium.

Hence from the above description of the capping head devices it will be noted that as the head disc 117 rotates with the body turret 71, the capping heads 115 move with the disc and remain in axial alignment with the body pockets 72 and the cover blank pockets 75 in the turret 71. During this rotation of the head disc 117 and turret 71 and immediately after the fully supported body C rides off the backing-up plate 108 (which takes place immediately after passing the station 11–11, Fig. 2), the knockout pad 125 within the die 116 moves toward and into engagement with the cover blank E retained in its pocket 75 by the outer guide rail 78. This movement of the knockout pad 125 is effected by the groove 133 in the stationary cam 134 as the cam roller 132 attached to the knockout rod 126 traverses the groove with the rotation of the head disc 117.

During this movement of the knockout pad 125 toward the cover blank E, the body mandrel 81 on the opposite side of the blank E resumes its travel toward the blank and thereby advances the fully supported body C into engagement with the blank, clamping the latter between the knockout pad 125 and the mandrel 81 at the end of the body C as shown in Fig. 12. This takes place at station 12–12, Fig. 2, just before the termination of the guide rail 78 and its release of the blank E.

Upon engagement of the blank E by the mandrel 81, the knockout pad 125 reverses its movement and recedes within the forming die 116 while the mandrel 81 continues its forward travel toward the die, thus maintaining the blank E clamped adjacent the end of the body. The movement of the knockout pad 125 and the mandrel 81 takes place between the stations 12–12 and 13–13 in Fig. 2 and results in the blank E being forced out of its pocket 75 and the blank and the adjacent end of the body C being forced into the forming die 116 as shown in Fig. 13.

This action bends the overhanging marginal edge portions of the blank E inwardly from a vertical position into a horizontal position around and against the side walls of the body while maintaining the clamped portion of the blank against the end of the body. Thus a tight fitting cap or cover A having a skirt B is formed from the blank E and is simultaneously applied to the end of the body (Fig. 13) with the thermoplastic adhesive G interposed between the cover skirt B and the side walls of the body. Thus the mandrel 81 backs up or supports the body and holds it in a true squared position while the cover is formed around the body and is applied to it.

The body C with its formed and attached cover A momentarily remain in the forming die 116 until the heat generated in the die by the heating element 119 reduces the adhesive to a tacky condition to bond the cover skirt B to the body. This is accomplished by the time the capping head 115 and its cooperating mandrel 81 reaches the station 13–13 (Fig. 2).

Upon reaching station 13–13 (Fig. 2) the cam grooves 93, 133 controlling the reciprocation of the mandrel 81 and the knockout pad 125, slide the mandrel and the pad in unison together with the body C and its applied cover A toward the right as viewed in Fig. 13 until the body and its applied cover are entirely removed from the die and the skirt B of the cover is in lateral alignment with the chilled pressure or squeezer jaws 141 as shown in Fig. 14. While the assembled body and cover passes from station 14–14 to station 15–15 the cam groove 152 (Fig. 1) in the stationary cam 134 slides the actuating cone 148 toward the right as viewed in Fig. 1 and thereby spreads the actuating rollers 147 apart. This rocks the rocker arms 143 and thus closes the chilled pressure or squeezer jaws 141 against the skirt B of the cover A while the body C is still fully supported on the mandrel 81. The pressure exerted by these jaws against the cover skirt tightly presses the skirt against the side walls of the body and simultaneously chills the tackified adhesive G to a hard or solid condition. Thus the cover A is permanently bonded to the end of the body C.

After thus bonding the cover A to the body C the pressure jaws 141 are opened to their original positions as shown in Figs. 6, 13 and 15 and the knockout pad 125 continues its travel toward the mandrel to push the body C and its applied cover A back into the oringinal position of the body in its turret pocket 72 as best shown in Fig. 15. With the body in this position the knockout pad 125 returns to its original position partially within the die recess 118 and the mandrel 81 continues its outward travel to remove itself from within the body as progressively shown in Figs. 16 and 17.

During this withdrawal of the mandrel 81 from the body, the outer end of the body engages against stripper faces or elements 166 (Figs. 4 and 17) at the ends of the mandrel support ribs 82 in the support bearing 84 and thus strips the body from the mandrel and holds the body in proper position in its turret pocket 72. This position is shown in Fig. 17 with the mandrel fully removed. In this position of the body, the squaring and aligning fingers 97 recede to their original positions as shown in Fig. 17. The body C with its attached cover A is then ready for discharge from the machine.

Discharge of the body C from the machine preferably is effected by a pair of spaced and parallel continuously rotating star wheels 168 (Fig. 2) which are similar to the entrance star wheels 66. The discharge star wheels 168 are formed with spaced peripheral pockets 169 for receiving the bodies from the turret 71. The wheels are mounted on a shaft 171 which extends across the machine in a manner similar to the cross shaft 49 (Fig. 1) and which is journaled in bearings formed in the side frames 27. One end of the shaft 171 extends beyond the frames and carries a gear 172 (Fig. 9) which meshes with and is driven by the gear 54 on the main driving shaft 55. Thus the star wheels 168 are rotated in time with the turret 71.

As a capped body C is moved into position adjacent the discharge star wheels 168 by rotation of the turret 71, the body enters a pocket 169 of the star wheels and simultaneously rides up onto a retaining rail 174 (Fig. 2) which curves under and upwardly around the periphery of the star wheel toward the top thereof. The rotating star wheels thus sweep the capped body out of its turret pocket 72 and carry it upwardly toward the top of the wheels. At this uppermost position the star wheels deposit the capped body into a substantially horizontal runway 176 defined by a continuation of the guide rail 174 and cooperating guide rails 177. The bodies as they enter this runway accumulate and push each other along to any suitable place of deposit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for forming and securing a fibre end closure member to a fibre container body, the combination of a heated forming die for forming a closure member from a blank, means for retaining in axial alignment with said die a closure member blank carrying on its marginal edge portions a thermoplastic adhesive, a support for holding a container body in endwise axial alignment with said blank, a mandrel disposed in axial alignment with said die and movable into said body for supporting the end of the body to be closed, actuating means for advancing said mandrel toward and away from said die for insertion of the mandrel into said body and for carrying the body into engagement with said blank and for inserting said blank and said body into said die for forming the blank over the end of said body and for heating said adhesive to bond said formed blank to said body, and a relatively stationary bearing block surrounding said mandrel and having tongues extending into clearance grooves in said mandrel, said tongues having stripper faces for engaging and stripping said closed body from said mandrel when said mandrel is moved away from said die.

2. A machine for forming and securing a fibre end closure member to a fibre container body, comprising a heated cup shaped forming die, a plurality of squeezer jaws surrounding said die in axially spaced alignment therewith, means for supporting a substantially flat closure member blank carrying on its marginal edge portions a thermoplastic adhesive, means for supporting a tubular container body axially of said supported closure member blank, a movable mandrel disposed in axial alignment with said die, means for inserting said mandrel into said tubular body and thereafter for advancing said mandrel with said body and said blank into the open end of said die for bending the marginal edges of said blank inwardly over the end of said container while tackifying said adhesive, said advancing means being thereafter operative to withdraw said mandrel and its supported closed end of said body from said die to position said inwardly bent closure member marginal edges in registry with said surrounding squeezer jaws, means for moving said squeezer jaws inwardly against the closure member marginal edges for adhesively bonding the closure member to the container body, and means within said die movable axially in timed relation to the inward and outward movement of said mandrel for exteriorly engaging said closure member and maintaining it in clamped relation against the end of said body during their movement into and out of said die and during the bending, tackifying and bonding operations.

3. A machine for forming and securing a fibre end closure member to a fibre container body as defined in claim 2, having means for squaring up a supported tubular rectangular container body, and means for telescoping said squaring up means over the end of said supported body prior to the projection of said mandrel thereinto by said inserting means.

4. A machine for forming and securing a fibre end closure member to a fibre container body, comprising a heated cup shaped forming die having means for supporting the same, a plurality of squeezer jaws movably mounted on said die support and surrounding the open end of said die in axially spaced alignment therewith, pocket means spaced axially from said die for supporting a substantially flat closure member blank carrying on its marginal edge portions a thermoplastic adhesive, a second pocket means for exteriorly supporting a tubular container body in axially spaced relation to said supported closure member blank, a movable mandrel disposed in axial alignment with said die and with said container body on the opposite side thereof, cam actuated means for inserting said mandrel into the open end of said tubular body remote from said die and thereafter for longitudinally advancing said mandrel with said body into engagement with said blank to force the latter into the open end of said die for bending the marginal edges of said blank inwardly over the end of said container while simultaneously tackifying said adhesive by said heated die, said cam actuated means being thereafter operative to withdraw said mandrel and its supported closed end of said body from said die to position said inwardly bent closure member marginal edges in registry with said surrounding squeezer jaws, cam actuated means for moving said squeezer jaws inwardly against the closure member marginal edges for adhesively bonding the closure member to the container body, and a clamping pad housed within said die and having cam means for moving said pad axially relative to said die in timed relation to the inward and outward movement of said mandrel, whereby said pad exteriorly engages against said closure member to hold the latter in clamped relation against the end of said body and said mandrel during movement of said body and mandrel into and out of said die while said blank bending, adhesive tackifying and closure bonding operations are being performed.

5. A machine for forming and securing a fibre end closure member to a fibre container body as defined in claim 4, said machine having a plurality of squaring bars surrounding said mandrel and carried by an axially movable hollow support, and cam means operative independently of said mandrel actuating cam means for moving said hollow support to telescope said squaring bars over the end of the supported container body prior to the projection of said mandrel thereinto by its associated cam actuated means.

6. A machine for forming and securing fibre end closure members to fibre container bodies, comprising a rotatable head disc, a plurality of heated cup-shaped dies carried on said disc in circumferentially spaced relation for forming end closure members from substantially flat blanks, a plurality of squeezer jaws carried by said disc and surrounding each of said dies in axial alignment therewith, a rotatable turret adjacent said head disc and having peripherally spaced pockets disposed in axial alignment with said dies respectively for supporting substantially flat end member blanks each carrying on its marginal edge portions a thermoplastic adhesive, said turret also having peripherally spaced pockets respectively disposed in axial alignment with said end member pockets respectively for supporting container bodies in axial alignment with their corresponding end members, a rotatable drum disposed in axial alignment with said turret, a drive shaft for rotating said head disc and turret and said drum in unison, a plurality of mandrels carried on said drum in axial alignment with said dies and respectively insertable into container bodies for internally supporting the ends of said bodies to be closed, stationary cam means connected to said mandrels for advancing the latter and the container bodies supported thereby against said blanks and thence into said dies for folding the marginal edges of said blanks over the ends of said containers while said adhesive is tackified by said heated dies, said cam means being further operative to withdraw said mandrels and their supported container bodies from said dies to position the closed ends of said bodies in registry with said squeezer jaws, means for moving said squeezer jaws against the tackified marginal edges of said closure members to adhesively secure the closure members to their respective bodies, a clamping pad housed within each of said dies for holding said end members against the open ends of said bodies, and means for moving said pads axially in time with the movement of said mandrels to maintain said end members clamped against the body ends during the aforesaid folding and securing operations.

7. A machine of the character defined in claim 6, wherein means are provided for simultaneously feeding container bodies and end members in axially spaced relation into said axially aligned turret pockets respectively during the rotation of said turret.

8. A machine of the character defined in claim 6, wherein means are carried by said drive shaft for squaring up rectangular container bodies supported by the turret pockets, and means actuated by the rotation of said shaft for projecting said squaring up means over the ends of said bodies prior to the insertion of said mandrels thereinto by said cam means.

9. A machine as defined in claim 6, wherein said squeezer jaws are hollow and means are provided for circulating a fluid cooling medium through said jaws to expedite the bonding of the tackified thermoplastic adhesive on said end members to the container bodies.

10. A machine as defined in claim 6, wherein stripper elements are carried by said drive shaft encircling the path of movement of each of said mandrels for stripping the closed container bodies therefrom as the mandrels are retracted by said cam means.

11. In a machine for forming and securing fibre end closure members to fibre container bodies, the combination of a rotatable turret having circumferentially spaced pairs of axially spaced and aligned end member and container body pockets on the periphery thereof, means adjacent said turret for feeding a flat strip of fibre end member material along a path of travel, means for successively transversely severing rectangular end member blanks from said strip, means for successively positioning said cut end member blanks adjacent said turret, means for feeding container bodies into axial alignment with said positioned end members respectively, means for thereafter successively feeding said bodies into the container body turret pockets simultaneously with the further successive advancement of the end members by said positioning means into the end member turret pockets while maintaining the axial alignment of a container body and end member blank in each circumferentially spaced turret pocket pair, and means for rotating said turret in synchronism with the movement of said body and end member feeding means to successively position a said end member and a said container body in axially spaced relation in their respective turret pocket pairs as the turret rotates.

12. In a machine for forming and securing fibre end closure members to fibre container bodies, the combination of a rotatable turret having circumferentially spaced pairs of axially spaced and aligned end member and container body pockets on the periphery thereof, means adjacent said turret for feeding a flat strip of fibre end member material along a path of travel, a reciprocating knife operable in time with the advancement of said strip for successively transversely severing rectangular end closure member blanks from said strip, a conveyor for successively positioning said cut end member blanks adjacent said turret, means for feeding container bodies into axial alignment with said positioned end members respectively, endless conveyor means for thereafter successively feeding said axially aligned bodies into the container body turret pockets simultaneously with the further successive advancement of the end members by said first mentioned conveyor into the end member turret pockets while maintaining the axial alignment of the bodies and end members respectively in each of the circumferentially spaced pairs of turret pockets, means for rotating said turret in synchronism with the movement of said body and end member conveyor means to successively position a said end member and a said container body in axially spaced relation in their respective turret pockets as the turret rotates, and a rotatable star wheel for successively removing the closed container bodies from said turret pockets.

References Cited in the file of this patent

UNITED STATES PATENTS

| | | |
|---|---|---|
| 792,583 | Carncross | June 20, 1905 |
| 1,050,606 | Bond | Jan. 14, 1913 |
| 1,125,043 | Beadle | Jan. 19, 1915 |
| 1,134,808 | Beadle | Apr. 6, 1915 |
| 1,161,544 | Starr | Nov. 23, 1915 |
| 1,448,026 | Ford | Mar. 13, 1923 |
| 1,540,321 | Ferguson | June 2, 1925 |
| 2,101,291 | Price | Dec. 7, 1937 |
| 2,200,276 | Hothersall et al. | May 14, 1940 |
| 2,413,449 | Hatch | Dec. 31, 1946 |
| 2,445,214 | Ferguson | July 13, 1948 |
| 2,531,914 | Lager et al. | Nov. 28, 1950 |
| 2,604,827 | Hickin et al. | July 29, 1952 |

FOREIGN PATENTS

| | | |
|---|---|---|
| 290,354 | Germany | Sept. 2, 1914 |